United States Patent [19]

Takei

[11] Patent Number: 5,613,403
[45] Date of Patent: Mar. 25, 1997

[54] DRIVE APPARATUS EQUIPPED WITH A BALL SCREW AND AN XY DRIVE APPARATUS CONTAINING SAID DRIVE APPARATUS

[75] Inventor: Seiji Takei, Kanagawa, Japan

[73] Assignee: Nippon Thompson Co., Ltd., Tokyo, Japan

[21] Appl. No.: 462,891

[22] Filed: Jun. 5, 1995

[30]     Foreign Application Priority Data

Jul. 11, 1994  [JP]  Japan ..................................... 6-181780
May 16, 1995  [JP]  Japan ..................................... 7-141279

[51] Int. Cl.⁶ .............................. F16H 25/22; F16H 25/24
[52] U.S. Cl. ................ 74/490.09; 74/89.15; 74/424.8 B; 74/459; 108/20; 108/143
[58] Field of Search ........................... 74/89.15, 424.8 B, 74/459, 490.09; 108/20, 143

[56]             References Cited

U.S. PATENT DOCUMENTS 4,270,404   6/1981   Murakoshi et al. ................ 74/490.09
4,872,362  10/1989   Kemper et al. ................ 74/424.8 B X
5,327,795   7/1994   Katahira .............................. 74/424.8 B

FOREIGN PATENT DOCUMENTS 2683012   4/1993   France ............................... 74/424.8 B
5-332416  12/1993  Japan ................................ 74/424.8 B

*Primary Examiner*—Allan D. Herrmann
*Attorney, Agent, or Firm*—Sughrue, Mion, Zinn, Macpeak & Seas

[57]             ABSTRACT

A drive apparatus equipped with a ball screw which drastically improves the feeding accuracy of the driven members. The drive apparatus is equipped with detecting devices that have mutually different resolutions so as to detect the amount of rotation of each of a plurality of nuts possessed by the ball screw, thereby improving the overall resolution of the apparatus.

24 Claims, 11 Drawing Sheets

DRIVE APPARATUS EQUIPPED WITH A BALL SCREW AND AN XY DRIVE APPARATUS CONTAINING SAID DRIVE APPARATUS

BACKGROUND OF THE INVENTION

1. Field of the Invention

The present invention relates to a drive apparatus equipped with a ball screw, and an XY drive apparatus containing said drive apparatus.

2. Description of the Prior Art

FIG. 1 indicates an XY drive apparatus of the prior art. Furthermore, this XY drive apparatus is disclosed in Japanese Laid-Open Patent Publication No. 2-116442.

As shown in the drawing, said apparatus respectively has relative moving members in the form of bed 1 and moving table 2. In this case, however, bed 1 is taken to be the stationary side and moving table 2, located above said bed 1, operates as the moving side. Moving table 2 is guided by a guiding device having the constitution described below, and freely moves two-dimensionally with respect to bed 1.

Namely, two track rails 4 are fixed in parallel on the upper surface of bed 1. Another two track rails 5 are attached in parallel on the lower surface of moving table 2 so as to transverse said track rails 4. Sliders 7 are respectively arranged between the mutually intersecting portions of these upper and lower track rails 4 and 5. Each of said sliders 7 is engaged to freely move relative to each of both track rails 4 and 5. As a result of having said constitution, moving table 2 freely moves two-dimensionally in the X and Y directions.

Next, the following provides an explanation of the driving device that drives the above-mentioned moving table 2.

As shown in the drawing, motors (rotating type) 11 and 12 are mounted on bed 1 and moving table 2 via brackets 11a and 12a so that the central axis of rotation of each coincides with the above-mentioned X and Y directions. Each of said motors contains an internal ball nut (not shown) so that it integrally rotates with its rotor core (not shown), and are provided with threaded shafts 14 and 15, respectively, onto which these ball nuts are screwed. One end of each of said threaded shafts 14 and 15 is coupled to the above-mentioned sliders 7 via coupling plates 17 and 18. As a result of the driving device being composed in this manner, in this constitution, moving table 2 operates by each of motors 11 and 12 suitably rotating.

In the apparatus like that described above, the feeding positional accuracy of the moving table is affected not only by the mechanical accuracy of the ball nuts, threaded shafts, track rails and so forth, but also by the number of divisions of the encoder that detects the amount of rotation of the ball nuts or threaded shafts. The number of divisions refers to the resolution by which the amount of rotation of the ball nuts or threaded shafts is detected. Thus, the use of an encoder with a large number of divisions results in higher resolution of feeding control of the moving table, thereby improving feeding positional accuracy. However, encoders having a large number of divisions are expensive, thus resulting in increased costs.

SUMMARY OF THE INVENTION

In consideration of the above-mentioned points, the object of the present invention is to provide a drive apparatus and XY drive apparatus that have improved feeding accuracy without using an expensive encoder.

The drive apparatus according to the present invention comprises a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; wherein, each said rotary driving device contains a detecting device that detects the amount of rotation of each of said nuts, and each of said detecting devices has a different resolution.

In addition, the drive apparatus according to the present invention comprises a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; wherein, each said rotary driving device contains a detecting device that detects the amount of rotation of each of said nuts, and each of said detecting devices has the same resolution while the leads of said two types of left and right screw grooves are slightly different.

Moreover, the drive apparatus according to the present invention comprises a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; wherein, each said rotary driving device contains a detecting device that detects the amount of rotation of each of said nuts, and each of said detecting devices has a different resolution and the leads of said two types of left and right screw grooves are slightly different.

In addition, the drive apparatus according to the present invention is equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution.

In addition, the drive apparatus according to the present invention is equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has the same resolution while the leads of said two types of left and right screw grooves are slightly different.

In addition, the drive apparatus according to the present invention is equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution and the leads of said two types of left and right screw grooves are slightly different.

Moreover, the XY drive apparatus according to the present invention is equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution.

In addition, the XY drive apparatus according to the present invention is equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has the same resolution while the leads of said two types of left and right screw grooves are slightly different.

In addition, the XY drive apparatus according to the present invention is equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution and the leads of said two types of left and right screw grooves are slightly different.

In said constitution, a screw shaft is moved forward and backward by the rotation of a plurality of nuts. The orientation of this forward and backward movement as well as the amount of movement are freely controlled by the direction of rotation and amount of rotation of each nut. The resolution of this control system is further improved due the detection devices provided for each nut having mutually different resolutions, or each of the detection devices having mutually identical resolutions while the leads of the two types of left and right screw grooves are slightly different, or each of the detection devices has mutually different resolutions and the leads of the two types of left and right screw grooves are slightly different.

DESCRIPTION OF THE PREFERRED EMBODIMENTS

The following provides an explanation of the preferred embodiments of the present invention while referring to the attached drawings.

Figure 1:
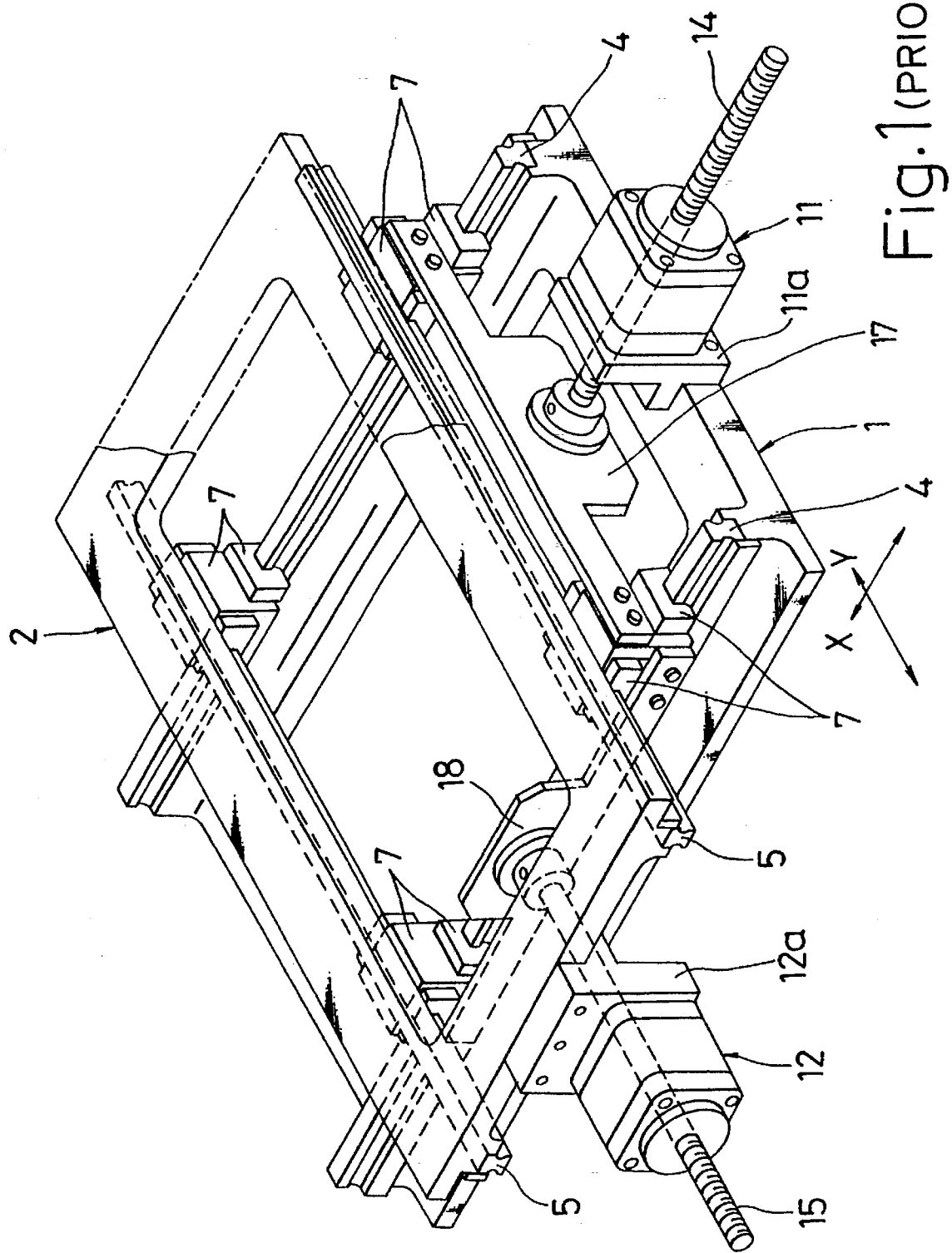
FIG. 1 is a perspective view of an XY drive apparatus of the prior art.
Figure 2:
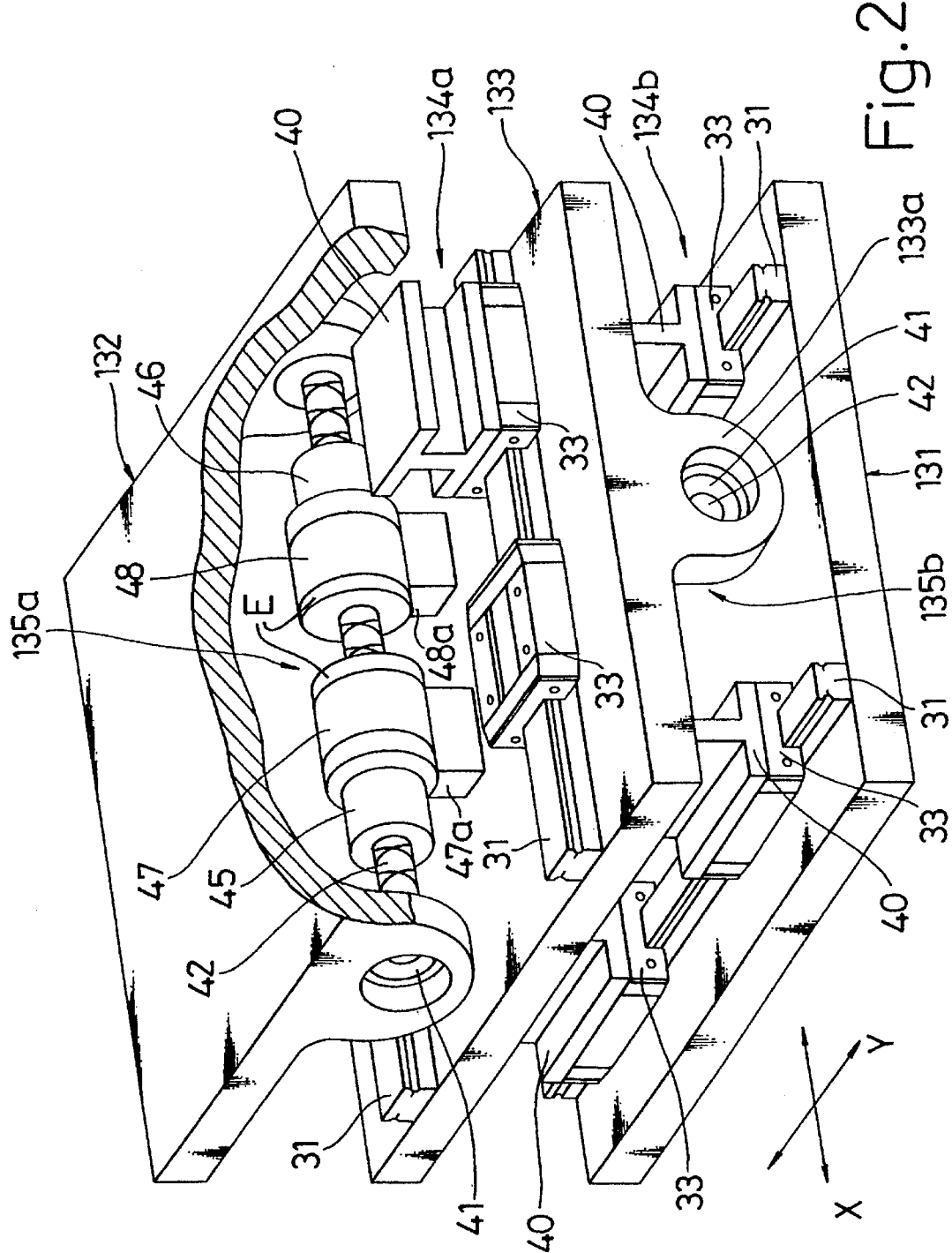
FIG. 2 is a perspective view, including a partial cross-section, of an XY drive apparatus as a first embodiment of the present invention.

FIG. 2 indicates an XY drive apparatus as a first embodiment of the present invention. As shown in the drawing, said XY drive apparatus has relative moving members in the form of bed 131 and moving table 132, respectively, and operates by bed 131 below being arranged as stationary side, while moving table 132 above is arranged as the moving side. Bed 131 and moving table 132 are mutually of nearly the same shape and size, and each is roughly in the shape of a flat plate overall.

Intermediate table 133, of roughly the same size as said moving table 132, is arranged between the above-mentioned bed 131 and moving table 132. A first guiding device 134a and second guiding device 134b are juxtaposed on this intermediate table 133 so as to enable moving table 132 to move in the X direction, and enable bed 131 to move in the Y direction perpendicular to said X direction. Namely, said first guiding device 134a is provided on intermediate table 133, holds moving table 132 and guides it in the above-mentioned X direction. In addition, second guiding device 134b is provided on bed 131, holds said intermediate table 133 and guides it in the above-mentioned Y direction.

A first driving device 135a is provided between the above-mentioned moving table 132 and intermediate table 133 that drives said moving table 132 in the above-mentioned X direction with respect to intermediate table 133, while a second driving device 135b is provided between intermediate table 133 and bed 131 that drives intermediate table 133 in the above-mentioned Y direction with respect to bed 131. Said first driving device 135a and second driving device 135b are provided corresponding to the above-mentioned first guiding device 134a and second guiding device 134b, respectively.

A guiding device that guides relative moving members in the form of bed 131 and moving table 132 two-dimensionally is composed by the above-mentioned first guiding device 134a and second guiding device 134b. In addition, a driving device that respectively and relatively drives said bed 131 and moving table 132 is composed by the above-mentioned first driving device 135a and second driving device 135b.

First, the following provides a detailed explanation of the above-mentioned guiding devices. Furthermore, since first guiding device 134a and second guiding device 134b mutually have identical constitutions, the explanation here will be given for second guiding device 134b as a representative example. However, in FIG. 2, those constituent members of first guiding device 134a omitted from the explanation that correspond to the constituent members of the second guiding device 134b explained below will be indicated with the same reference numerals.

Figure 3:
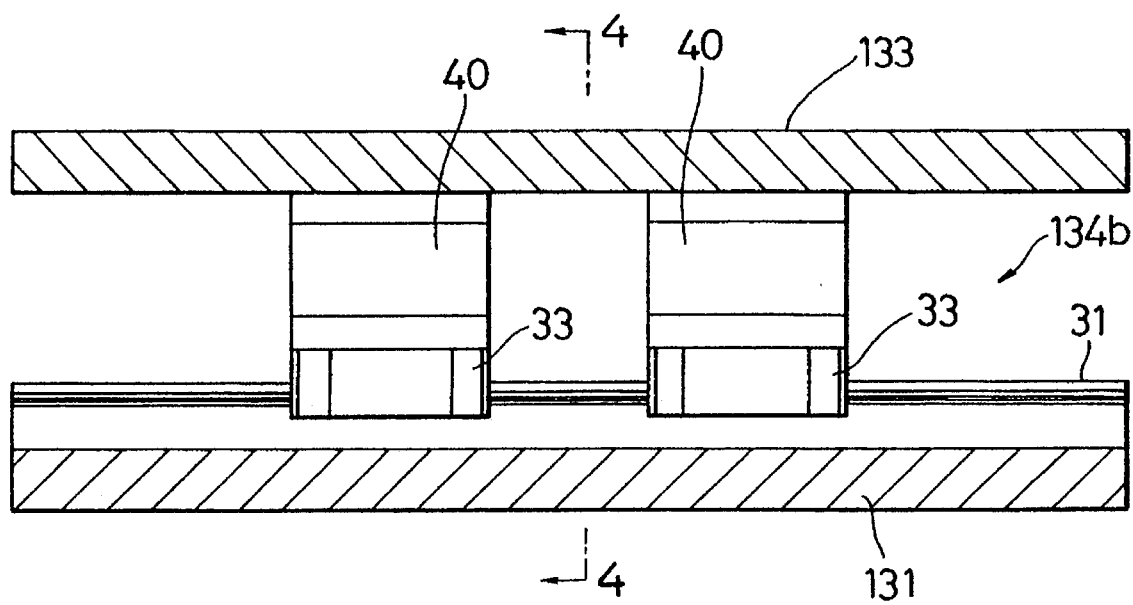
FIG. 3 is a vertical cross-sectional view indicating the essential portion of the guiding device equipped on the XY drive apparatus shown in FIG. 2.
Figure 4:
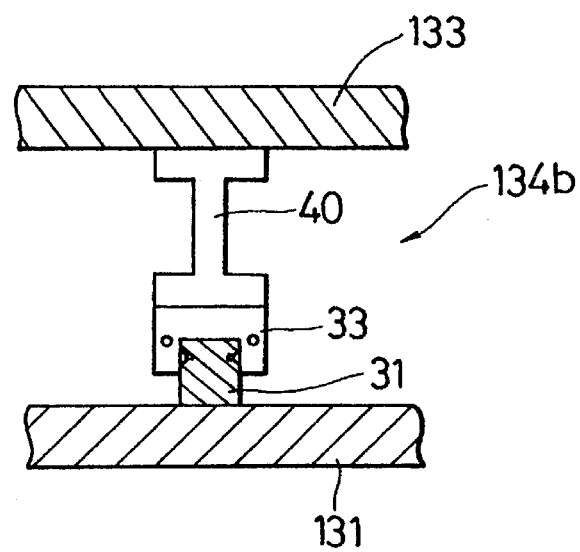
FIG. 4 is a cross-sectional view taken along 4—4 relating to FIG. 3.

As shown in FIGS. 2 through 4, second guiding device 134b is composed of two track rails 31 provided in parallel on bed 131, a total of 4 sliders in the form of slide units 33, two of each are mounted to slide freely on each of said track rails 31, and brackets 40, having an I-shaped cross-section, that couple intermediate plate 133 with each of said slide units 33.

Figure 5:
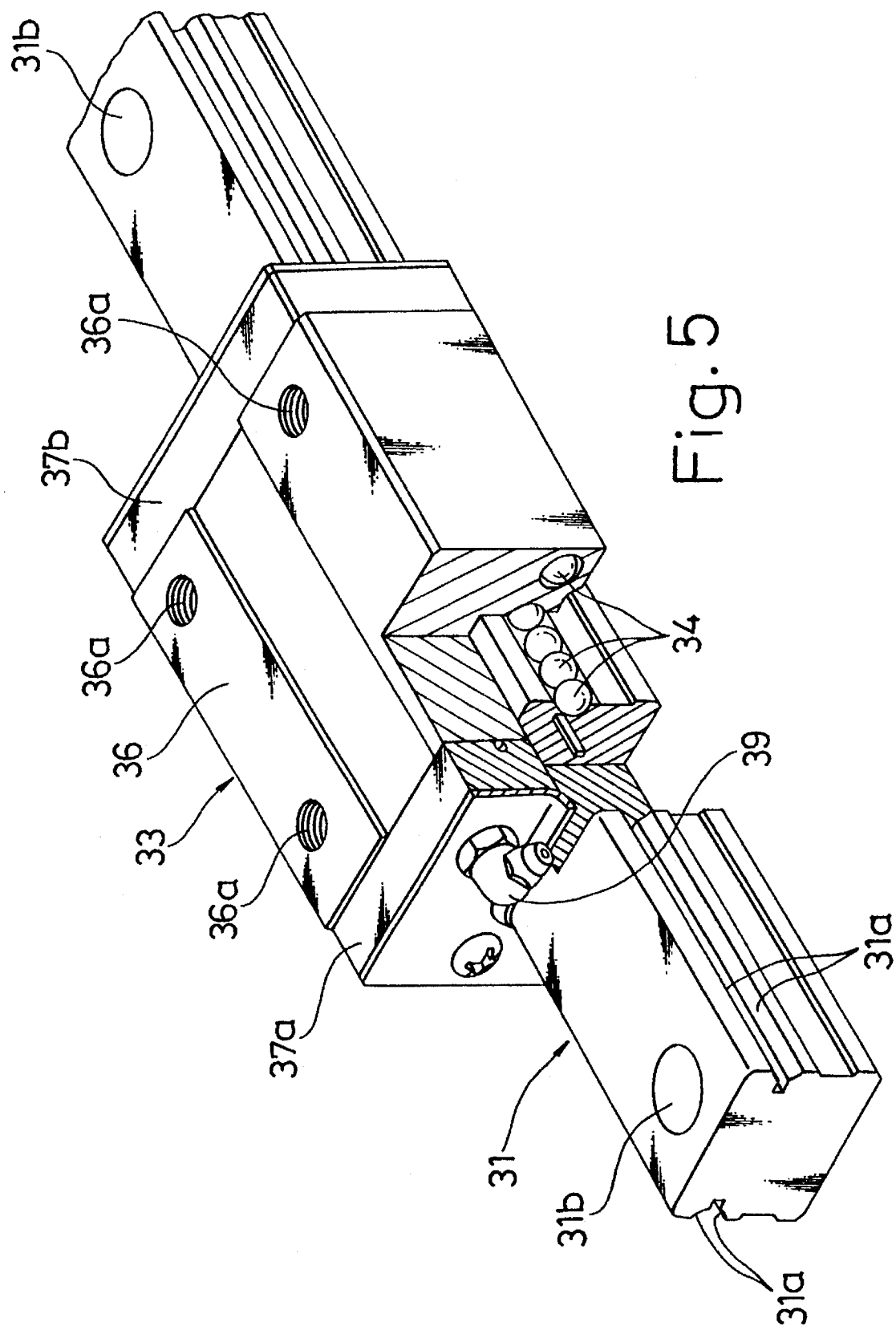
FIG. 5 is a perspective view, including a partial cross-section, of the guiding device equipped on the XY drive apparatus shown in FIG. 2.
Figure 6:
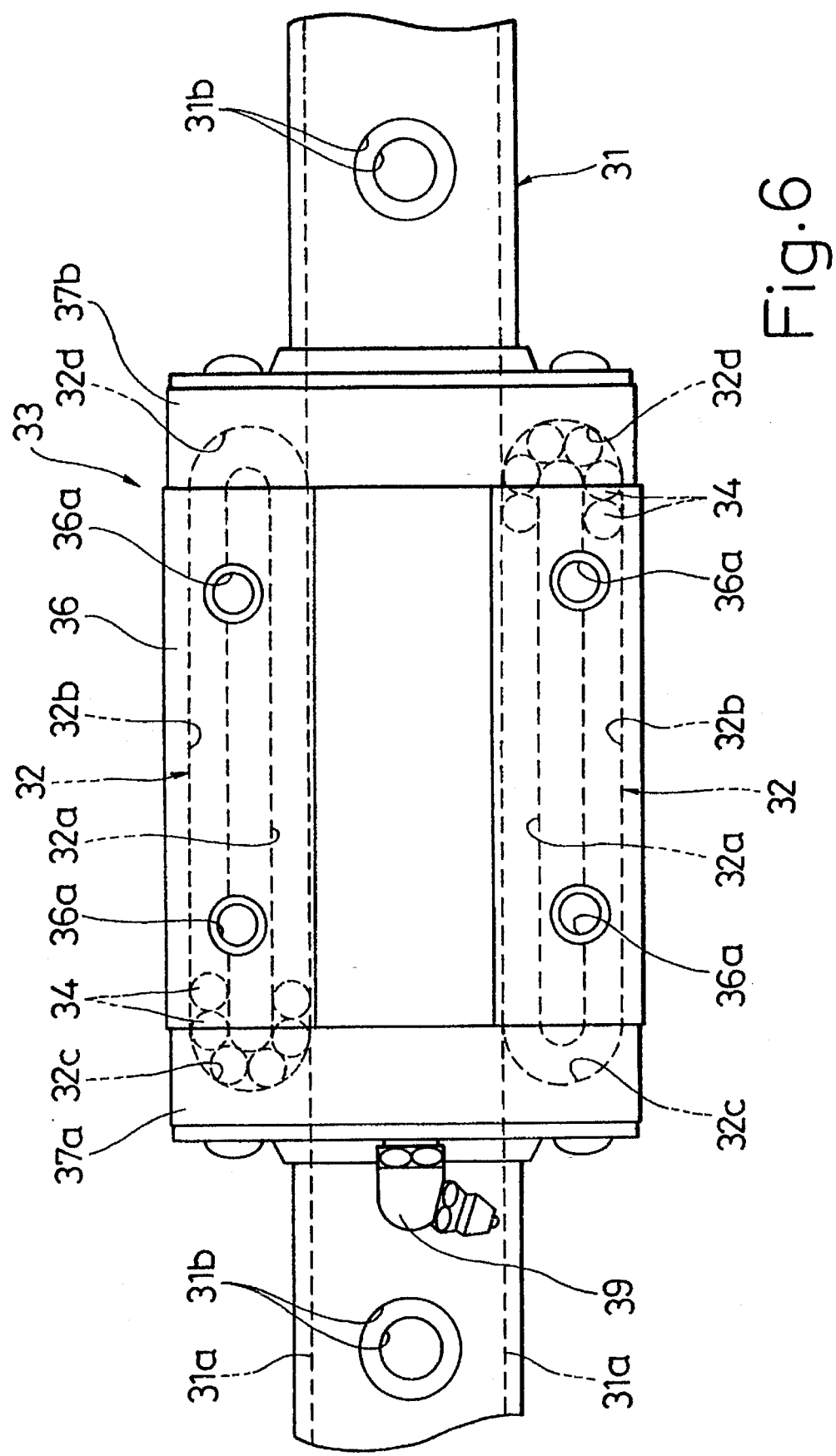
FIG. 6 is an overhead view of the constitution shown in FIG. 5.

As shown in FIGS. 5 and 6, the above-mentioned track rails 31 have one track in the form of track groove 31a each in the lengthwise direction on both the right and left sides. Slide units 33 have a rolling element circulating path 32 (see FIG. 6), and a plurality of rolling elements in the form of balls 34, arranged and contained within this rolling element circulating path 32, circulate within rolling element circulating path 32 while rolling over the above-mentioned tracks 31a to enable sliding of slide units 33 on track rails 31.

As shown in FIG. 5 and 6, slide unit 33 has casing 36, having a U-shaped cross-section and provided so as to be juxtaposed about track rail 31, and a pair of end caps 37a and 37b coupled to both the front and back ends of said casing 36. Grease nipple 39 is attached to one of the end caps 37a for supplying grease to the above-mentioned balls 34. As shown in FIG. 6, the above-mentioned rolling element circulating path 32 is composed of a load bearing track groove 32a and return path 32b formed in casing 36 mutually in parallel and passing linearly through said casing 36, and a pair of roughly arc-shaped direction changing paths 32c and 32d formed in both end caps 37a and 37b that connect both ends of said load bearing track groove 32a and return path 32b. Furthermore, said load bearing track groove 32a opposes track groove 31a of track rail 31.

Furthermore, reference numeral 31b in FIGS. 5 and 6 indicates bolt insertion holes into which bolts (not shown) are inserted for mounting the above-mentioned track rail 31 to bed 131. Reference numeral 36a indicates threaded holes into which bolts (not shown) are screwed for mounting the above-mentioned brackets 40 to slide unit 33.

Next, the following provides a detailed explanation of the driving devices previously mentioned. Furthermore, since first driving device 135a and second driving device 135b have complete identical constitutions, the explanation here is only provided for second driving device 135b as a representative example. However, in FIG. 2, those constituent members of first driving device 135a omitted from the explanation that correspond to the constituent members of the second guiding device 135b explained below will be indicated with the same reference numerals.

Figure 7:
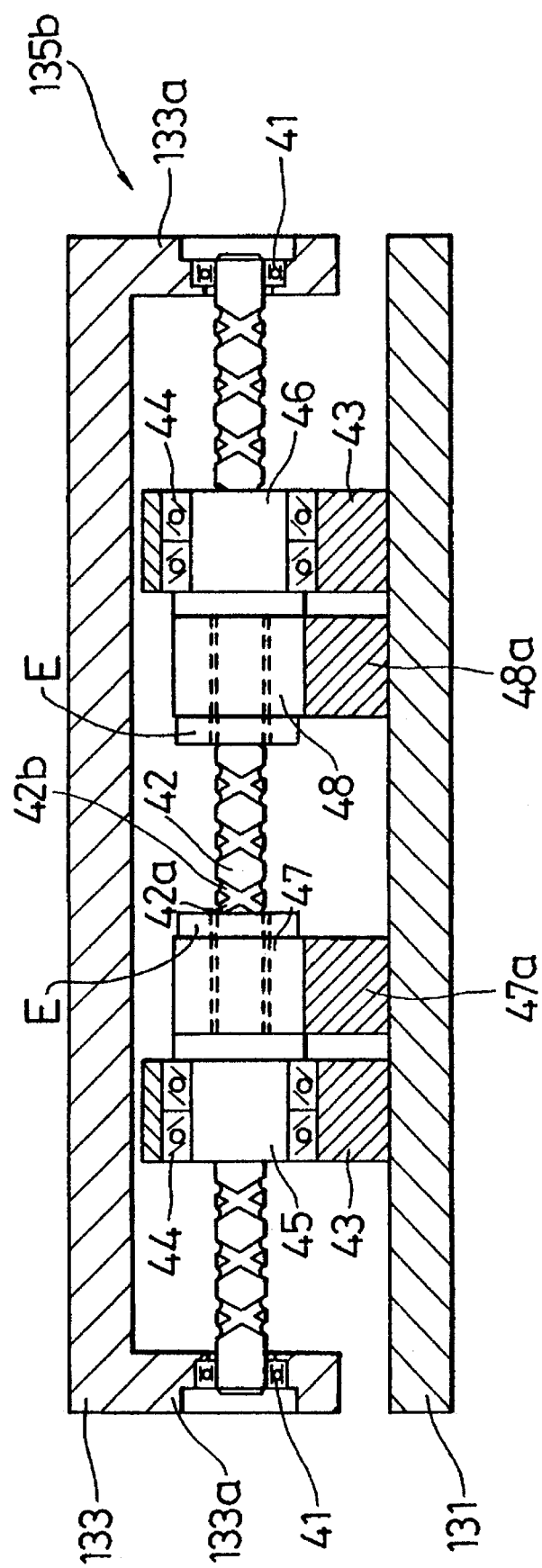
FIG. 7 is a vertical cross-sectional view indicating the essential portion of the driving device equipped on the XY apparatus shown in FIG. 2.

As shown in FIG. 7, this second driving device 135b is composed of a single screw shaft 42, axially supported to rotate freely by bearing 41 such as a ball bearing on both side walls 133a hanging down from intermediate table 133, two nuts 45 and 46 loosely fit onto the above-mentioned screw shaft 42 and supported to rotate freely by means of bearing 44 such as a ball bearing on mounting seat 43 fixed on the upper surface of bed 131, and rotary driving devices in the form of two motors 47 and 48 that independently rotate each of nuts 45 and 46. Two types of left and right screw grooves 42a and 42b are formed in the state in which they are mutually crossing in this screw shaft 42. Furthermore, the above-mentioned mounting seat 43 and bearing 44 are generically referred to as a support mechanism. Both of the above-mentioned motors 47 and 48 are mounted to bed 131 by means of mounting seats 47a and 48a, are fit loosely on screw shaft 42, and the rotating portions of said motors are attached to nuts 45 and 46.

Figure 8:
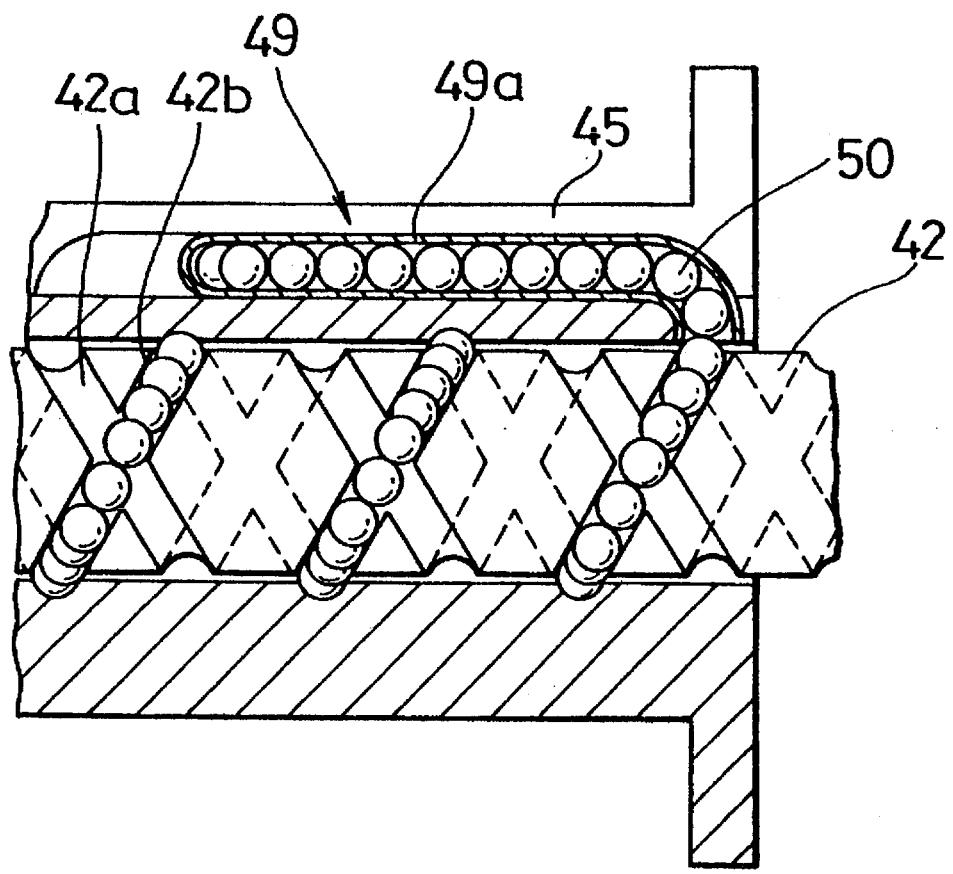
FIG. 8 is a vertical cross-sectional view of a portion of the constitution shown in FIG. 7.

FIG. 8 indicates the relationship between the above-mentioned screw shaft 42 and one of the nuts 45. Since the relationship between screw shaft 42 and the other nut 46 is structurally no different with the exception of the direction of screw groove used being different, an explanation of the relationship for the other nut is omitted.

As can be understood from FIG. 8, ball circulating path 49 is formed corresponding to one of the screw grooves 42b as a result of nut 45 being provided with return tube 49a. A large number of balls 50 are arranged and contained within this ball return path 49, and balls 50 circulate accompanying relative rotation of screw shaft 42 and nut 45.

Furthermore, the above-mentioned motors 47 and 48 are composed of, for example, stepping motors or servo motors, and in addition to those of various types of operating principles arranged coaxially with screw shaft 42, various types of motors can also be used that are linked to screw shaft 42 by means of power transmitting devices such as gears, pulleys or belts.

Next, the following provides an explanation of the action of movement of intermediate table 133 with respect to bed 131 that is performed by the operation of the above-mentioned second driving device 135b.

First, although it is necessary to move screw shaft 42 back to move intermediate table 133 (in the Y direction), the state of movement of screw shaft 42 varies according to the difference in the amount of rotation and the difference in the direction of rotation of the pair of nuts 45 and 46.

(Case of the pitch of screw grooves 42a and 42b in screw shaft 42 being the same)

| Difference in rotating speeds between both nuts | No difference | No difference | Different rotating speeds |
|---|---|---|---|
| Direction of rotation of both nuts | Same direction | Opposite direction | Same or opposite direction |
| State of movement of screw shaft | Rotation at that position | Forward and backward movement only, no rotation | Forward and backward movement while rotating |

(Case of the pitch of screw grooves 42a and 42b in screw shaft 42 being different)

| Difference in rotating speeds between both nuts | No difference | No difference | Different rotating speeds |
|---|---|---|---|
| Direction of rotation of both nuts | Same direction | Opposite direction | Same or opposite direction |
| State of movement of screw shaft | Rotation at that position | Forward and backward movement while rotating | Forward and backward movement while rotating |

As is clear from these tables, when motors 47 and 48 are started and both nuts 45 and 46 are mutually rotated in the opposite directions, screw shaft 42 moves back by an amount corresponding to the pitch of screw grooves 42a and 42b and the amount of rotation of both nuts 45 and 46. Thus, intermediate table 133, which supports screw shaft 42 by means of bearing 41, moves in the Y direction with respect to bed 131. At this time, intermediate table 133 is guided smoothly and with high precision in the Y direction as a result of slide unit 33 sliding over track rail 131 in the previously mentioned second guiding device 134b. On the other hand, in a completely similar manner, in first driving device 135a, as a result of both motors 47 and 48 being started and nuts 45 and 46 rotating in mutually opposite directions, screw shaft 42 moves forward and backward, and moving table 132, which supports this screw shaft 42, moves in the X direction with respect to intermediate table 133. At this time, moving table 132 is guided smoothly and with high precision in the X direction as a result of slide unit 33 sliding over track rail 31 in the previously mentioned first guiding device 134a. Accordingly, an object (not shown) loaded on moving table 132 is moved two-dimensionally.

Movement control of moving table 132 in the X and Y directions as described above is performed by controlling the direction of rotation and amount of rotation of a total of four motors 47 and 48, two each of which are equipped on the above-mentioned first driving device 135a and second driving device 135b. Namely, said control is performed by controlling the direction of rotation and amount of rotation of each of nuts 45 and 46 that are rotated and driven by each of said motors. Consequently, each motor 47 and 48 is provided with a detection device in the form of a rotary encoder E that detects the amount of rotation. The positioning accuracy of the XY drive apparatus is affected by the resolution of said rotary encoder E with the exception of mechanical accuracy such as the screw groove pitch of screw shaft 42 and so forth. If a single nut were assumed to be driven with a single motor having a rotary encoder with 2000 divisions per rotation, and the lead of the screw shaft was assumed to be 20 mm, the resolution would be 10 μm. On the other hand, in the present embodiment, since the above-mentioned first driving device 135a and second driving device 135b have two independently controlled motors each, by making the number of divisions of the rotary encoders provided for these two motors different, the above-mentioned resolution is improved. For example, if resolution $E_1$ of the rotary encoder provided on motor 47 in the second driving device 135b is 2000 and resolution $E_2$ of the rotary encoder provided on motor 48 is 2048, the total number of divisions E0 per rotation is:

$$E_0 = \frac{E_1 \times E_2}{E_2 - E_1} \times 2$$

whereby, $$E_0 = \frac{2000 \times 2048}{2048 - 2000} \times 2$$

This is equivalent to being equipped with a rotary encoder having roughly 200,000 divisions. Thus, if a screw shaft in which one lead is 20 mm, the resolution becomes roughly 0.1 μm, thus obtaining a resolution 100 times greater. In addition, since similar results are obtained for the first driving device 135a, a dramatic improvement in the positioning accuracy of moving table 132 results.

Furthermore, since rotary encoders having a large number of divisions are expensive and there are limitations on the number of divisions, combining two rotary encoders in the manner described above allows an XY drive apparatus to be obtained at low cost while still having high accuracy.

Figure 9:
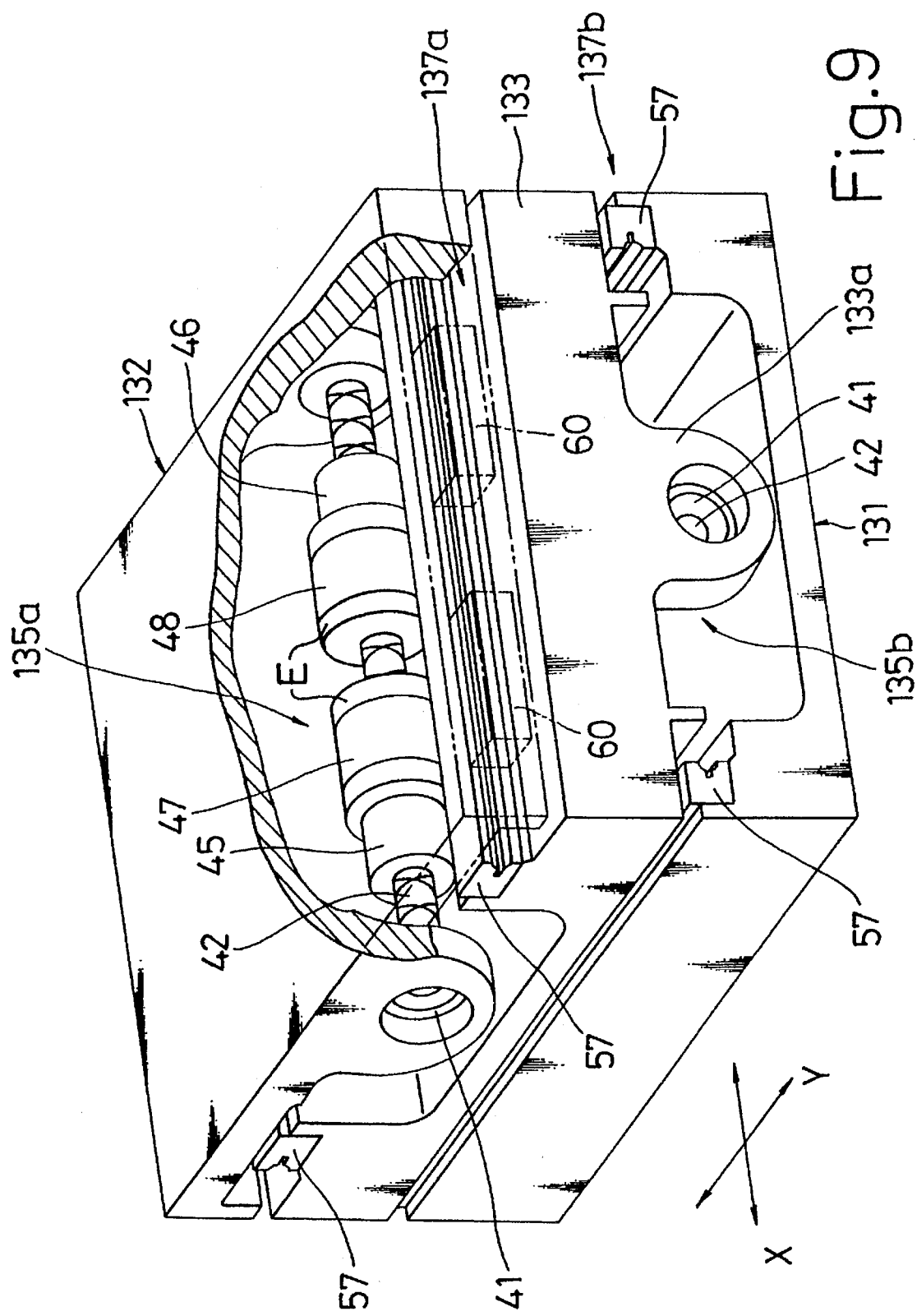
FIG. 9 is a perspective view, including a partial cross-section, of an XY drive apparatus as a second embodiment of the present invention.
Figure 10:
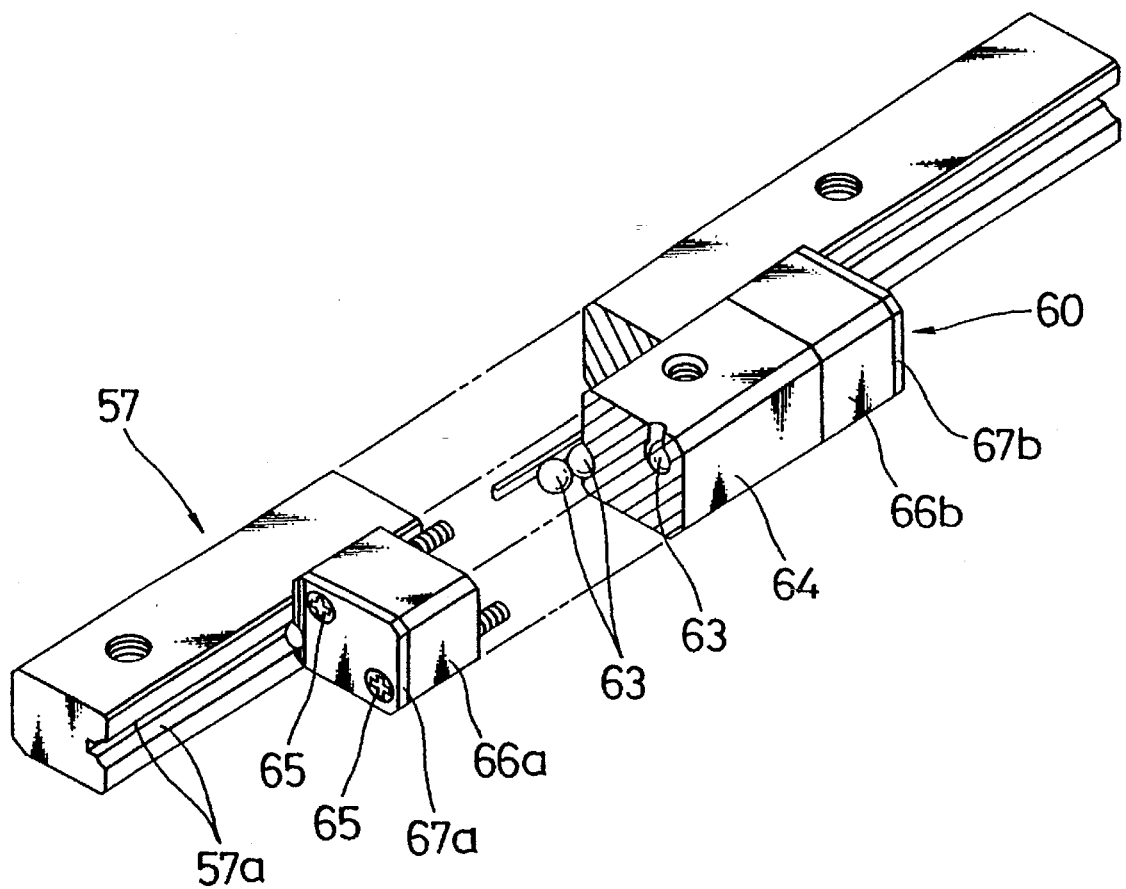
FIG. 10 is a perspective view, including a partial cross-section, of the essential portion of the guiding device equipped on the XY drive apparatus shown in FIG. 9.
Figure 11:
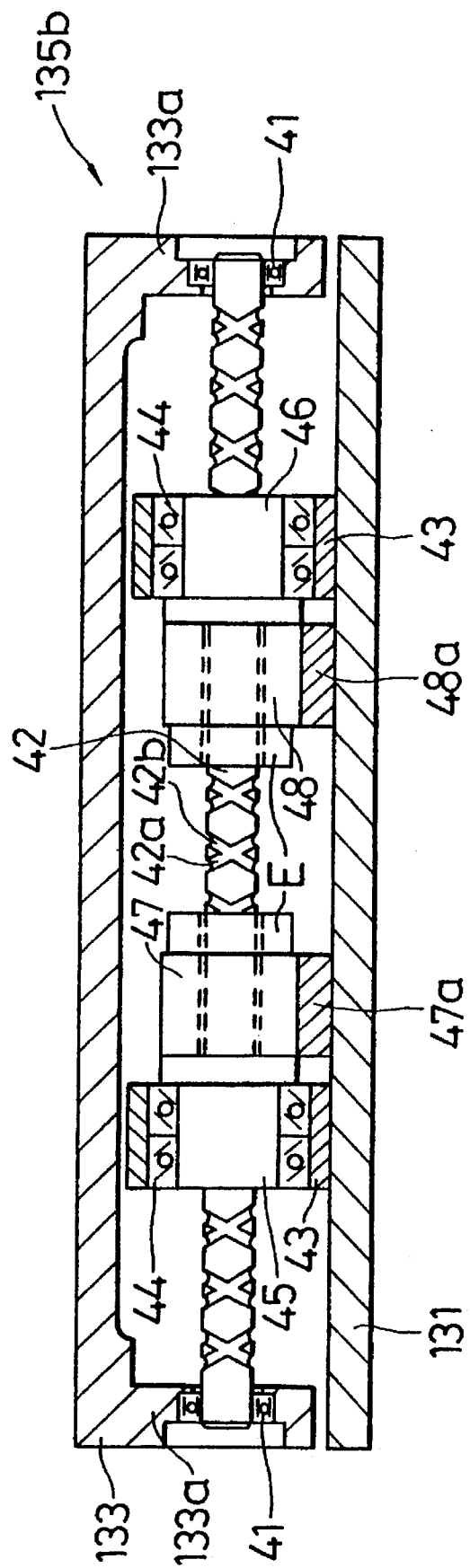
FIG. 11 is a vertical cross-sectional view indicating the essential portion of the driving device equipped on the XY drive apparatus shown in FIG. 9.

Next, an explanation is provided of an XY drive apparatus as a second embodiment of the present invention with reference to FIGS. 9 through 11. Furthermore, since said XY drive apparatus is composed in the same manner as the XY drive apparatus as a first embodiment of the present invention shown in FIGS. 2 through 8 with the exception of those portions explained below, the explanation only covers those essential portions and an explanation of the entire apparatus is omitted. In addition, those constituent members that are identical or correspond with constituent members of said XY drive apparatus of the first embodiment are indicated with the same reference numerals.

This embodiment is characterized by a guiding device that guides both relative moving members in the form of bed 131 and moving table 132 two-dimensionally while allowing to move relative to each other. As shown in FIG. 9, first guiding device 137a and second guiding device 137b, composed in a mutually similar manner, are respectively composed with two track rails 57 and a slider in the form of slide member 60 that is able move relative to said track rail 57. Said track rail 57 is fastened to the upper surface of bed 131 or intermediate table 133 by a plurality of bolts, while slide member 60 is fastened to the lower surface of moving table 132 or intermediate table 133 by a plurality of bolts. As shown in FIG. 10, a single track in the form of track groove 57a, having a roughly arc-shaped cross-section, is formed on the outside of track rail 57. Slide member 60 is arranged to the outside of said track rail 57.

A ball circulating path (not shown) is formed in the above-mentioned slide member 60, and a large number of balls 63 are arranged and contained within said ball circulating path. These balls 63 bear the load between track rail 57 and slide member 60 by circulating while rolling over track groove 57a of track rail 57 accompanying movement of slide member 60 with respect to track rail 57.

As shown in FIG. 10, slide member 60 has casing 64, a pair of end caps 66a and 66b coupled to both ends of said casing 64 by round head screws, and two seals 67a and 67b fastened together to the outer surfaces of both said end caps 66a and 66b. The above-mentioned rolling element circulating path is composed of a load bearing track groove and return path formed in casing 64 mutually in parallel and passing linearly through said casing 64, and a pair of roughly arc-shaped direction changing paths formed in both end caps 66a and 66b that connect both ends of said load bearing track groove and return path. In addition, said load bearing track groove opposes track groove 57a of track rail 57.

As can be understood from FIG. 10, the above-mentioned slide member 60 has the overall shape such that its cross-sectional shape is roughly that of a rectangular parallelopiped, and is positioned at roughly the same height as the outer lateral surface of track rail 57. Moreover, its upper surface is directly mounted to moving table 132 or intermediate table 133. Thus, the guiding device composed by this slide member 60 and track rail 57 has a low height, thus enabling the drive apparatus to be thin.

As shown in FIG. 9, in said XY drive apparatus, first driving device 135a and second driving device 135b are arranged in the directions in which moving table 132 and intermediate table 133 mutually cross in the centers of their respective lower surfaces, while first guiding device 137a and second guiding device 137b, having the above-mentioned constitution, are arranged on the sides of each of said driving devices 135a and 135b along said driving devices 135a and 135b. As a result of being arranged in this manner, the height of first driving device 135a and second driving device 135b can be reduced as shown in FIG. 11, thus enabling the overall drive apparatus to be thin.

Furthermore, in each of the XY drive apparatuses of the first and second embodiments explained thus far, although left and right screw grooves 42a and 42b formed in screw shaft 42 are mutually crossing, and both nuts 45 and 46 are arranged to be mutually in close proximity based on this constitution thereby enabling the apparatus to be compact in the axial direction of each of said screw shafts 42, the following constitution can also be applied.

Figure 12:
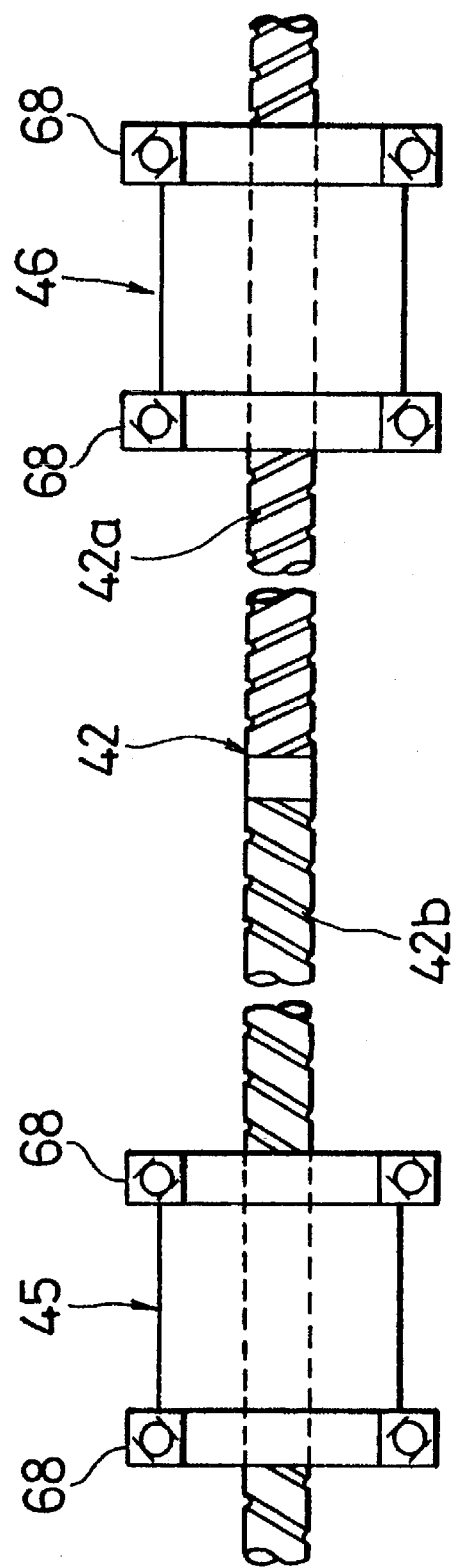
FIG. 12 is a side view indicating the essential portion of a variation of a driving device.

Namely, as shown in FIG. 12, in this constitution, each of left and right screw grooves 42a and 42b is formed by dividing along roughly the center of screw shaft 42 as the boundary between them, and each nut 45 and 46 is arranged at a distance from each other to as to correspond to each of said screw shafts 42a and 42b. Furthermore, reference numeral 68 indicates a bearing, and in this case an angular radial ball bearing, for attaching both said nuts 45 and 46 to mounting seats not shown while allowing to rotate freely. However, as a result of forming the two types of left and right screw grooves 42a and 42b of screw shaft 42 in a crossing state as in each of the above-mentioned embodiments, each nut 45 and 45 can be arranged in close proximity to each other, thus achieving compact size for the bearing structure that supports them while allowing to rotate freely, and particularly compact size in the axial direction of each nut.

In addition, the pitch of the two types of screw grooves 42a and 42b formed in screw shaft 42 indicated in each of the above-mentioned embodiments may be mutually equal or different. However, in the case the pitch differs, it is necessary to change the control of the amount of rotation of both nuts 45 and 46.

Moreover, although two ball screw nuts are provided for each drive unit in each of the above-mentioned embodiments, their number can be suitably set according to the need to increase driving force and so forth, such as to 4 or 6.

In addition, although XY apparatuses for two-dimensional driving have been explained as examples in the embodiments of the present invention, it goes without saying that the present invention can also be applied to drive apparatuses that perform one-dimensional driving. More specifically, in the apparatus shown in FIG. 2, a constitution can be considered wherein each of the members on intermediate table 133 is removed, and said intermediate table 133 is made to perform linear movement one-dimensionally with respect to a moving table in the form of bed 131.

In addition, although that having a mechanical constitution consisting of track rails and so forth was indicated for the guiding device that guides the moving members in each of the above-mentioned embodiments, a guiding device can also be employed having a constitution wherein moving members are levitated by the pressure of a fluid (air or oil) or by the magnetic force of a magnet. However, accurate and smooth guiding is performed by employing this type of guiding device having a mechanical constitution.

In addition, although the resolutions of each of the rotary encoders, namely detection devices, provided for the two motors were made to be different for the purpose of making the resolution of the overall apparatus extremely high, an equally high resolution can be obtained by employing either of the constitutions described below.

First, the resolutions of each of the above-mentioned detection devices are made to be equal, while the leads of the two types of left and right screw grooves 42a and 42b formed in screw shaft 42 are made to be different.

Next, simultaneous to making the resolutions of each of the above-mentioned detection devices different, the leads of the above-mentioned two types of left and right screw grooves 42a and 42b are set to be slightly different.

More specifically, in the case, for example, that the numbers of divisions $E_1$ and $E_2$ of the rotary encoders E provided for motors 47 and 48 of the second driving device 135b as described above are equal and $E_1$ ($E_2$)=2000, while the lead of one of the screw grooves 42a of screw shaft 42 is 20 mm and the lead of the other screw groove 42b is 18 mm, although their resolutions are only 10 μm and 9 μm, respectively, the total resolution is equal to half of that difference, namely 0.5 μm. Thus, this is equivalent to obtaining a resolution that is 20 times greater.

In addition, if the numbers of divisions of the rotary encoders E provided for motors 47 and 48 of second driving device 135b are made to be different, and the leads of the two types of left and right screw grooves 42a and 42b are made to be slightly different as previously described, resolution is also improved.

In addition, the above applies similarly with respect to the first driving device 135a, and this results in a dramatic improvement in the positioning accuracy of moving table 132.

As has been explained above, in the present invention, a rotary driving device, which rotates and drives a plurality of nuts provided to perform forward and backward movement on a screw shaft, contains a detection device that detects the amount of rotation of each said nut, and each said detection device is composed to that its resolution is mutually different, or so that each detection device has the same resolution while the leads of two types of left and right screw grooves are slightly different, or so that each detection device has a different resolution and the leads of two types of left and right screw grooves are slightly different. As a result, the resolution of the overall apparatus is drastically improved, thus enabling a high degree of feeding accuracy to be obtained inexpensively.

Moreover, in the present invention, two types of left and right screw grooves of a screw shaft are formed to be in a mutually crossing state. As a result, the distance between a plurality of nuts can be set to a short distance, thereby achieving compact size for the apparatus.

In addition, in the present invention, a guiding device having a mechanical constitution composed of track rails and a slide unit (slider) is employed for the guiding device. As a result, accurate and smooth feeding is able to be obtained by an apparatus having improved resolution.

What is claimed is:

1. A drive apparatus comprising a screw shaft axially supported at opposite ends and in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices in the form of hollow motors fit loosely on said screw shaft and having rotating portions respectively attached to said nuts so as to individually rotate and drive each of said nuts; wherein, each said rotary driving device contains a detecting device that detects the amount of rotation of each of said nuts, and each of said detecting devices has a different resolution.

2. A drive apparatus as set forth in claim 1 wherein each of said two types of left and right screw grooves formed in said screw shaft are formed in a mutually crossing state.

3. A drive apparatus comprising a screw shaft axially supported at opposite ends and in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices in the form of hollow motors fit loosely on said screw shaft and having rotating portions respectively attached to said nuts so as to individually rotate and drive each of said nuts; wherein, each said rotary driving device contains a detecting device that detects the amount of rotation of each of said nuts, and each of said detecting devices has the same resolution while the leads of said two types of left and right grooves are slightly different.

4. A drive apparatus comprising a screw shaft axially supported at opposite ends and in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices in the form of hollow motors fit loosely on said screw shaft and having rotating portions respectively attached to said nuts so as to individually rotate and drive each of said nuts; wherein, each said rotary driving device contains a detecting device that detects the amount of rotation of each of said nuts, and each of said detecting devices has a different resolution and the leads of said two types of left and right screw grooves are slightly different.

5. A drive apparatus equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution.

6. A drive apparatus as set forth in claim 5 wherein each of said two types of left and right screw grooves formed in said screw shaft are formed in a mutually crossing state.

7. A drive apparatus as set forth in claim 5 wherein said guiding device has a track rail in which a track is formed in the lengthwise direction, and a slider able to move relative to said track rail.

8. A drive apparatus as set forth in claim 5, wherein each of said two types of left and right screw grooves formed in said screw shaft are formed in a mutually crossing state, and wherein said guiding device has a track rail in which a track is formed in the lengthwise direction, and a slider able to move relative to said track rail.

9. A drive apparatus equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has the same resolution while the leads of said two types of left and right screw grooves are slightly different.

10. A drive apparatus as set forth in claim 9, wherein each of said two types of left and right screw grooves formed in said screw shaft are formed in a mutually crossing state.

11. A drive apparatus as set forth in claim 9, wherein each of said two types of left and right screw grooves formed in said screw shaft are formed in a mutually crossing state, and wherein said guiding device has a track rail in which a track is formed in the lengthwise direction, and a slider able to move relative to said track rail.

12. A drive apparatus equipped with a bed; a moving member that moves with respect to said bed; a guiding device that guides said moving member; and, a driving device that drives said moving member; wherein, said driving device has a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution and the leads of said two types of left and right screw grooves are slightly different.

13. A drive apparatus as set forth in claim 12, wherein each of said two types of left and right screw grooves formed in said screw shaft are formed in a mutually crossing state.

14. A drive apparatus as set forth in claim 12, wherein each of said two types of left and right screw grooves formed in said screw shaft are formed in a mutually crossing state, and wherein said guiding device has a track rail in which a track is formed in the lengthwise direction, and a slider able to move relative to said track rail.

15. An XY drive apparatus equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution.

16. An XY drive apparatus as set forth in claim 15 wherein each of said two types of left and right screw grooves formed in said screw shaft are formed in a mutually crossing state.

17. An XY drive apparatus as set forth in claim 15 wherein said first and second guiding devices have a track rail in which a track is formed in the lengthwise direction, and a slider able to move relative to said track rail.

18. An XY drive apparatus as set forth in claim 15, wherein each of said two types of left and right screw grooves formed in said screw shaft are formed in a mutually crossing state, and wherein said first and second guiding devices have a track rail in which a track is formed in the lengthwise direction, and a slider able to move relative to said track rail.

19. An XY drive apparatus equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has the same resolution while the leads of said two types of left and right screw grooves are slightly different.

20. An XY drive apparatus as set forth in claim 19, wherein each of said two types of left and right screw grooves formed in said screw shaft are formed in a mutually crossing state.

21. An XY drive apparatus as set forth in claim 19, wherein each of said two types of left and right screw grooves formed in said screw shaft are formed in a mutually crossing state, and wherein said first and second guiding devices have a track rail in which a track is formed in the lengthwise direction, and a slider able to move relative to said track rail.

22. An XY drive apparatus equipped with a pair of relative moving members; a guiding device that mutually guides said relative moving members so as to freely move relatively and two-dimensionally, and driving devices that relatively drive each of said relative moving members; wherein said guiding device has a first guiding device that holds one of said pair of relative moving members and guides it in a prescribed direction, and a second guiding device that holds said first guiding device and guides it in a direction roughly perpendicular to said prescribed direction with respect to the other relative moving member; and wherein said driving devices are provided corresponding to said first and second guiding devices and have a screw shaft in which two types of left and right screw grooves are formed; a plurality of nuts fit loosely onto said screw shaft and provided with ball circulating paths corresponding to each of said screw grooves, respectively; a plurality of balls arranged and contained within said ball circulating paths that circulate accompanying relative rotation of said screw shaft and nuts; supporting mechanisms that support each of said nuts so as to be able to rotate freely; and rotary driving devices able to individually rotate and drive each of said nuts; and wherein, each said rotary driving device contains a detecting device that detects the amount of rotation of each of said nuts, and each of said detecting devices has a different resolution and the leads of said two types of left and right screw grooves are slightly different.

23. An XY drive apparatus as set forth in claim 22, wherein each of said two types of left and right screw grooves formed in said screw shaft are formed in a mutually crossing state.

24. An XY drive apparatus as set forth in claim 22, wherein each of said two types of left and right screw grooves formed in said screw shaft are formed in a mutually crossing state, and wherein said first and second guiding devices have a track rail in which a track is formed in the lengthwise direction, and a slider able to move relative to said track rail.

\* \* \* \* \*